(12) United States Patent
Suhanic et al.

(10) Patent No.: US 12,353,569 B2
(45) Date of Patent: Jul. 8, 2025

(54) SYSTEMS AND METHODS FOR GENERATING AND USING ENTITY SPECIFIC DATA ASSETS

(71) Applicant: gDial Inc., Toronto (CA)

(72) Inventors: West Suhanic, Toronto (CA); Peter Pennefather, Toronto (CA)

(73) Assignee: gDial Inc., Toronto (CA)

( * ) Notice: Subject to any disclaimer, the term of this patent is extended or adjusted under 35 U.S.C. 154(b) by 224 days.

(21) Appl. No.: 18/085,205

(22) Filed: Dec. 20, 2022

(65) Prior Publication Data

US 2023/0273978 A1 Aug. 31, 2023

Related U.S. Application Data

(60) Provisional application No. 63/314,119, filed on Feb. 25, 2022.

(51) Int. Cl.
*G06F 7/00* (2006.01)
*G06F 21/10* (2013.01)
*G06F 21/60* (2013.01)
*G06F 21/62* (2013.01)

(52) U.S. Cl.
CPC .......... *G06F 21/602* (2013.01); *G06F 21/105* (2013.01); *G06F 21/6245* (2013.01)

(58) Field of Classification Search
CPC .. G06F 21/602; G06F 21/105; G06F 21/6245; H04L 67/568; H04L 67/56; H04L 67/5682
USPC ............... 707/600, 635, 694, 736, 740, 769, 707/E17.116, E17.005, 637
See application file for complete search history.

(56) References Cited

U.S. PATENT DOCUMENTS

| | | | |
|---|---|---|---|
| 9,430,513 B1 * | 8/2016 | Iyangar | G06F 16/152 |
| 9,465,858 B2 | 10/2016 | Pennefather et al. | |
| 10,331,658 B2 | 6/2019 | Pennefather et al. | |
| 2008/0069098 A1 * | 3/2008 | Shah | G06Q 10/107 370/390 |
| 2010/0082672 A1 * | 4/2010 | Kottomtharayil | G06F 11/1451 711/E12.001 |
| 2010/0333116 A1 * | 12/2010 | Prahlad | G06F 3/0649 713/153 |

FOREIGN PATENT DOCUMENTS

KR 1889062 B1 * 8/2018 ........... G06F 21/602

* cited by examiner

*Primary Examiner* — Md I Uddin

(57) ABSTRACT

The use of digital data privacy asserting technology, including but not limited to encryption technology, is specified so as to create entity specific data assets that assert entity specific data rights, including but not limited to, the right to determine how that data can be used by others.

16 Claims, 7 Drawing Sheets

SYSTEMS AND METHODS FOR GENERATING AND USING ENTITY SPECIFIC DATA ASSETS

CROSS-REFERENCE TO RELATED APPLICATIONS

This application claims the benefit of U.S. Provisional Application No. 63/314,119 filed on Feb. 25, 2022, which is incorporated by reference herein in its entirety.

FIELD

The present embodiments are directed to systems and methods for generating and using encrypted entity specific data assets, and more specifically, to systems and methods for generating databases on-demand from data objects and using assets for creating databases for supporting markets for data assets owned by specific entities.

BACKGROUND

Digital data are composed of forms of digitally recorded bytes representing meaningful signals including: mathematical symbols, written words, numerical values, image pixels, sound frequencies, among others. Those data are configured as Data Objects (DOs) such as, but are not limited to, a jpeg image file, a word processor document, a database file, among others. These DOs are the product of a semiosis process of deliberately assembling data signs in a manner were the order, valence, and intensity of data signals stored as DOs communicate meaning in the form of information and knowledge. Individuated data have value, for example, economic value, especially when they can be aggregated into databases used in supporting data markets.

It is desirable to directly associate recorded data signals with data recording records. Useful recording records are sufficiently detailed to allow practitioners and users to reconstruct how the recording event generated the recorded signals stored as DOs, and to estimate the accuracy and precision of that recorded data. It is also useful to associate data signal recordings and recording records with data use specifications so that data ownership and other associated rights are respected.

In many cases, the information or knowledge derived from DOs will be related to a state or trait of an entity, or an object associated with an entity, in ways that bind possible inferences of the nature of those states and/or traits. Those relationships, signalized by DOs, are increasingly recognized as being associated with entity rights, such as the right to privacy, ownership, custody, and/or copyright, among others. There is a need for systems and methods that enable those rights to be signaled and asserted.

Regardless of whether the entity is a person, group, or people, or even a robot or a computer generated virtual agent, if that entity has agency to act autonomously, then data linked to them will be instantiated in a plurality of ways associated with entity specific circumstances, responsibilities, capacities, and rights. Entity specific data aggregated in databases drive multi-trillion dollar data aggregation and redistribution markets. Unfortunately, the aggregated data are, in most cases, built without the consent of entities whose data is included in the aggregated data. This situation is slowly changing with the introduction of privacy laws in various jurisdictions. However, for an entity's data to be protected as specified by those laws entities that the data are about need to be provided with explanations of how the data is to be used so that they can consent to those uses.

In the absence of such explanatory consultations and consent, entity specific data assets are vulnerable to misappropriation and misrepresentation, as well as other forms of data integrity degradation. A capacity to interact with the entity the data are about concerning data ownership, validity, integrity, and authority can have the utility of building trust, value, and significance in how the data are to be used.

In many situations, data degradation or distortions can harm the entity that the data are about. Indeed, there currently are major efforts nationally and internationally to develop legal frameworks to protect and assert data privacy rights while creating regulated markets for entity specific data, recognized as private. Such frameworks included but not limited to the California Privacy Rights Act, the California Consumer Privacy Act and the Virginia Consumer Data Protection Act, the European Union's General Data Protection Regulation (GDPR) framework, among others. The current specification is designed to have utility in fields of use associated with data asset markets, including markets for private personal data.

In all cases, the collection and sharing of entity specific data assets are inherently a computer-based problem. There is a need therefore for computer-based solutions for improved management of individuated data assets in order to address these challenges and unmet needs.

SUMMARY

The present embodiments represent an improvement in the containment of DOs assembled to be used as data assets in a plurality of data processing systems. These embodiments combine self-authentication technology with encryption technology so as to assert individuated rights associated with self-authenticating data assets. These transformations sets the stage for new ways of containing, conveying and consigning data assets within data markets assets.

This present embodiments describe linking data with entity specific limitations over how that data can be used, such as but not limited to, limitations generated by jurisdictional privacy protection legislation among other rights related to the data and asserting those rights through the use of encryption technology.

Systems and methods for data self-authentication and atomization are discussed in U.S. Pat. Nos. 9,465,858 and 10,331,658 which are both incorporated by reference herein in their entirety. In those references, the term self-authenticating unit of data is defined as individuated set of bytes that can be distinguished from all other sets of bytes resulting from data recording events because the data signals recorded in individuated events will be instantiated under distinct sets of situated circumstances and as such a hash of the recorded data signals and recording record for those signals can serve as a unique identifier (UID). Moreover, at any time after the association of the data signal values and recording record is instantiated, that UID can be used to verify that the set of bytes has remained unchanged. This means that the unit of data is also atomized as it is different from all other units of self-authenticating data.

The present embodiments may include methods and processes that materialize DOs together with specified relationships with places, processes, protocols, people, and other interacting entities, objects, and technologies associated with the creation of the DOs. These embodiments do so in ways that creates and supports existing markets for such DOs while having the utility of allowing data object owners to exert privacy and ownership rights, among other rights. Those relationships can be signaled as additional entries in the recording record in an ongoing manner, such as but not limited to instrumental data. This extended unit of data is then also individuated by being made self-authenticating and encrypted to assert ownership rights among other rights.

The embodiments may also include collecting record rights, can include data bounding data provenance information, claimed ownership rights, and use limitations specified by the entity the data are about, as well as, among other entries, privacy protection technology tokens such as encryption keys useful for asserting privacy rights, among other rights.

The embodiments may include asserting entity specific rights, that can include bounding data provenance information, claimed ownership rights, and use limitations specified by the entity the data.

The present embodiments are built around a newly developed file creation algorithm, specified here, called QEDX. The algorithm transforms any collection of one-or-more DOs through application of a set of operators. QEDX is an initialism for "quod erat demonstrandum" ("that which was to be demonstrated") extended. The QEDX file format uses encryption technology to assert explicit property rights and licensing terms specified by the owner of the QEDX files. QEDX files are designed to be owned and designed to be transacted.

In what follows the embodiments presented assume that DOs assembled as data assets exists on a computation device's local storage system. Note that examples of such DOs include, but are not limited to, a jpeg image file, a word processor document produced by Microsoft's Word program, a database file etc. Each of these can be considered as examples of DOs that exist on computation devices. A DO could have been placed on that computation device via, for example, a network transfer. The DO could also have been transferred via, for example, a solid state storage device such as a USB drive.

A set of one or more DOs targeted for QEDX transformation could have been created directly on the computation device using a purpose built application operated by an entity with agency, such as for example a person. In the embodiments found below the QEDX creation algorithm assumes the existence of the data asset composed of a single DO on a locally attached storage sub-system including but not limited to a network drive. Please note the inventors recognize that a future embodiment may have a version of the algorithm perform the QEDX creation steps assuming a data asset being received directly from a network interface.

The Construction and Deconstruction of a QEDX file may use a set of operators. Construction and Deconstruction may involve applying a number of steps, each applying a specific operator: 1) the CRYPTO_HASHSUM operator; 2) the ARCHIVE or the DEARCHIVE operators; 3) the ENCRYPT or the DECRYPT operators, 5) the ENCODE or the DECODE operators, 6) the RENAME_QEDX or the REPLACE_QEDX operators. Following completion of each of these steps a final step, 7) CLEANUP operator may be applied to insure no sensitive information is, for example, left behind.

In a first embodiment, there is provided a method of creating a data file, the method comprising: receiving, a data object (DO); generating, using a processor, a DO unique identifier, the DO unique identifier generated using a CRYPTO_HASHSUM operator on the DO; generating, using the processor, a first archive file comprising the DO unique identifier and the DO, the first archive file created using an ARCHIVE operator; generating, using the processor, an encrypted version of the first archive file, the encrypted version of the first archive file created using an ENCRYPT operator; generating, using the processor, a second archive file comprising the encrypted archive file and decryption information associated with the decryption of the encrypted archive file, the second archive file created using the ARCHIVE operator; generating, using the processor, an encoded archive file comprising an encoded version of the second archive file, the encoded version of the second archive file created using the ENCODE operator; generating, using the processor, a QEDX file by applying a RENAME QEDX operator on the encoded version of the second archive file; and executing, using the processor, a CLEANUP operator.

In one or more embodiments, the method may further include: storing, in a storage device in communication with the processor, the QEDX file in an indexable and searchable repository, the indexing configured to make the QEDX file findable in a search of the repository.

In one or more embodiments, the indexable and searchable repository is in network communication with the processor using the network interface.

In one or more embodiments, the indexable and searchable repository is connected using a serial interface to the processor.

In one or more embodiments, the generating, at the processor, in an archive file the DO unique identifier and the provided DO comprises: generating, using the processor, in an archive file the DO unique identifier, the provided DO and a map file that maps the QEDX file name to the provided DO.

In one or more embodiments, the method may further include: transmitting, using the network interface, the DO unique identifier and the DO using the NETWORK operator to a first different computation device; and executing, using the processor, the CLEANUP operator to remove the DO unique identifier and the provided DO.

In one or more embodiments, the DO is received over a network connection and stored in a local attached memory.

In a second aspect, there is provided a system for creating a data file, the system comprising: a memory; a network device; local storage in communication with the memory, receiving a data object (DO), and storing the DO in the memory; a processor in communication with the memory, the processor configured to: generate a DO unique identifier, the DO unique identifier generated using a CRYPTO_HASHSUM operator on the DO; generate a first archive file comprising the DO unique identifier and the DO, the first archive file created using an ARCHIVE operator; generate an encrypted archive file comprising an encrypted version of the first archive file, the encrypted version of the first archive file created using an ENCRYPT operator; generate a second archive file comprising the encrypted archive file and decryption information associated with the decryption of the encrypted archive file, the second archive file created using the ARCHIVE operator; generate an encoded archive file comprising an encoded version of the second archive file, the encoded version of the second archive file created using the ENCODE operator; generate a QEDX file by using a RENAME QEDX operator on the encoded version of the second archive file based on the encoded version of the second archive file, the QEDX file created using the RENAME_QEDX operator; and execute a CLEANUP operator.

In one or more embodiments, the system may further include: a storage device in communication with the processor for storing the QEDX file in an indexable and searchable repository, the indexing configured to make the QEDX file findable in a search of the repository.

In one or more embodiments, the storage device storing the indexable and searchable repository is in network communication with the processor using the network interface.

In one or more embodiments, the storage device storing the indexable and searchable repository is connected using a serial interface to the processor.

In one or more embodiments, the generating, at the processor, in an archive file the DO unique identifier and the provided DO comprises: generating, using the processor, in an archive file the DO unique identifier, the provided DO and a map file that maps the QEDX file name to the provided DO.

In one or more embodiments, the system may further include: transmitting, using the network interface, the DO unique identifier and the DO using the NETWORK operator to a first different computation device; and executing, using the processor, the CLEANUP operator to remove the DO unique identifier and the provided DO.

In one or more embodiments, the DO is received over a network connection and stored in a local attached memory.

In a third aspect, there is provided a method of generating a data object, the method comprising: receiving, a QEDX file; applying, using a processor a REPLACE_QEDX operator to the received QEDX file to generate a renamed file; decoding, using the processor, the renamed file using a DECODE operator to generate a decoded file; de-archiving, using the processor, the decoded file using a DEARCHIVE operator to generate a de-archived file; decrypting, using the processor, the de-archived file using a DECRYPT operator based on the decryption information in the de-archived file to generate a decrypted file; de-archiving, using the processor, the decrypted file using the DEARCHIVE operator to generate one or more data objects (DOs); applying, using the processor, a VERIFY_QEDX operator for the DO(s); and executing, using the processor, a CLEANUP operator.

In a fourth aspect, there is provided a system for generating a data object, the system comprising: a memory; a network device in communication with the memory, the network device receiving a QEDX file, and storing the QEDX file in the memory; a processor in communication with the memory and the network device, the processor configured to: apply a RENAME_QEDX operator to the received QEDX file to generate a renamed file; decode the renamed file using a DECODE operator to generate a decoded file; de-archive the decoded file using a DEARCHIVE operator to generate a de-archived file; decrypt the de-archived file using a DECRYPT operator based on the decryption information in the de-archived file to generate a decrypted file; de-archive the decrypted file using the DEARCHIVE operator to generate one or more data objects (DOs); execute a CRYPTO_HASHSUM operator on the one or more DOs to verify the integrity of the one or more DOs; apply a VERIFY_QEDX operator for the DO(s); and execute a CLEANUP operator.

DESCRIPTION OF EXEMPLARY EMBODIMENTS

Figure 1:
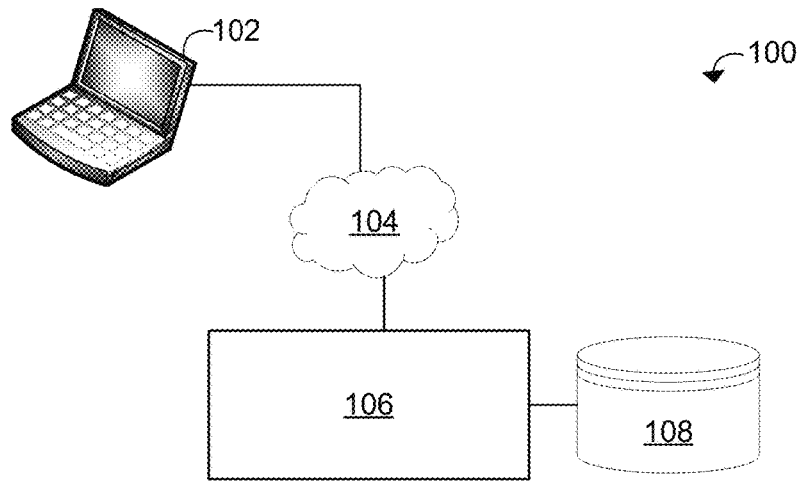
FIG. 1 is a system diagram showing a system for generating and using entity specific data assets in accordance with one or more embodiments.

Various apparatuses, systems or methods will be described below to provide an example of the claimed subject matter. No example described below limits any claimed subject matter and any claimed subject matter may cover methods or apparatuses that differ from those described below. The claimed subject matter is not limited to apparatuses or methods having all of the features of any one apparatus or methods described below or to features common to multiple or all of the apparatuses or methods described below. It is possible that an apparatus or methods described below is not an example that is recited in any claimed subject matter. Any subject matter disclosed in an apparatus or methods described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It should also be noted that the terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal or a mechanical element depending on the particular context. Furthermore, the term "communicative coupling" indicates that an element or device can electrically, optically, or wirelessly send data to another element or device as well as receive data from another element or device.

It should also be noted that, as used herein, the wording "and/or" is intended to represent an inclusive-or. That is, "X and/or Y" is intended to mean X or Y or both, for example.

As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Some elements herein may be identified by a part number, which is composed of a base number followed by an alphabetical or subscript-numerical suffix (e.g. 112a, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

The example systems and methods described herein may be implemented in hardware or software, or a combination of both. In some cases, the examples described herein may be implemented, at least in part, by using one or more computer programs, executing on one or more programmable devices comprising at least one processing element, a data storage element (including volatile and non-volatile memory and/or storage elements), and at least one communication interface. These devices may also have at least one input device (e.g. a keyboard, mouse, a touchscreen, and the like), and at least one output device (e.g. a display screen, a printer, a wireless radio, and the like) depending on the nature of the device. For example and without limitation, the programmable devices (referred to below as computing devices) may be a server, network appliance, embedded device, computer expansion module, a personal computer, laptop, personal data assistant, cellular telephone, smartphone device, tablet computer, a wireless device or any other computing device capable of being configured to carry out the methods described herein.

In some examples, the communication interface may be a network communication interface. In examples in which elements are combined, the communication interface may be a software communication interface, such as those for inter-process communication (IPC). In still other examples, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high-level procedural, declarative, functional or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Examples of the system may also be considered to be implemented as a non-transitory computer-readable storage medium, configured with a computer program, where the storage medium so configured causes a computer to operate in a specific and predefined manner to perform the functions described herein.

Furthermore, the example system, processes and methods are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various examples of systems, methods and computer programs products are described herein. Modifications and variations may be made to these examples without departing from the scope of the invention, which is limited only by the appended claims. Also, in the various user interfaces illustrated in the figures, it will be understood that the illustrated user interface text and controls are provided as examples only and are not meant to be limiting. Other suitable user interface elements may be used with alternative implementations of the systems and methods described herein.

Referring first to FIG. 1, there is shown a system diagram 100 showing a system for generating and using entity specific data assets in accordance with one or more embodiments.

The system diagram 100 includes user device 102, network 104, computing device 106, and database 108, which may be used to generate and use entity specific data assets. This is an example embodiment only. Many other application architectures are possible with different interfaces and different network topologies.

A user at user device 102 can access an application at computing device 106 via network 104. The user device 102 may be any two-way communication device with capabilities to communicate with other devices. The user device 102 may include, for example, a personal computer, a workstation, an embedded computer, a portable computer or a mobile phone device. The user device 102 may be used by a user to construct QEDX files, transact QEDX files, deconstruct received QEDX files, and otherwise manage data assets provided by the application provided by computing device 106.

The computing device 106 may enable access to QEDX operations via APIs to the user. The format of the data provided to, and from, the API may be XML, JSON, or another interchange format as known.

The data provided by the user at user device 102 to the computing device 106 may be stored in database 108, and may include one or more Data Objects (DOs).

DOs may be stored within a QEDX using the computing device 106, using the methods described herein. The archive may contain one or more DO files representing digital data assets where the integrity of each DO can be validated and ownership and use limitations indicated. The present embodiments further provide methods and systems incorporating encryption technology in the creation of a QEDX by the computing device 106 based on one or more existing DO files.

QEDX files containing DOs may be configured such that, among other utilities, they can contain, convey, and or consign all forms of DOs at any level of granularity. Creation of the QEDX file, using the QEDX construction method described herein, may include a deliberate act of a user at user device 102. Agents, with property rights over the QEDX file contents can assert their property rights by, for example, refusing to encrypt the contents with the other agent's public key, or alternatively, providing access to the file or by choosing to grant access to the DO asset contents by divulging the protection token such as the a password needed to decrypt DO encrypted using the recipient's public key. It will be evident to those skilled in the art that such specifications are applicable to all data access transactions, involving all forms of data encoded in DOs, including publicly owned data. The generation of QEDX files, and the use of DOs is described in further detail in FIGS. 4A-7.

Network 104 may be any network or network components capable of carrying data including the Internet, Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The computing device 106 may include an application for data asset file exchange (such as QEDX), for example, a data market enable the transfer of ownership of such files. The application 106 may provide reporting interfaces and user account management features as well as QEDX Construction, De-construction, search and retrieval functionality.

Figure 2:
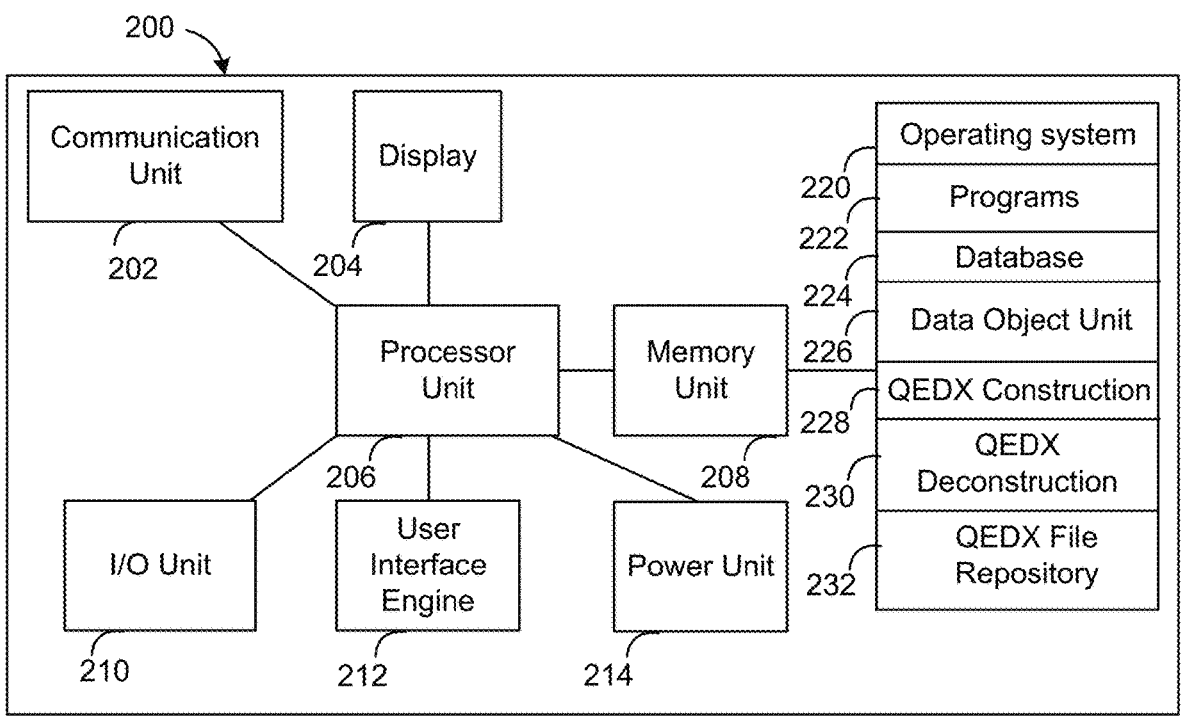
FIG. 2 is a device diagram in accordance with one or more embodiments.

The application of computing device 106 may run on a server such as the one described in FIG. 2, or it may operate on a service such as Amazon® Web Services®.

The database 108 may include a Structured Query Language (SQL) database such as PostgreSQL, SQLite3, or MySQL, or a not only SQL (NoSQL) database such as MongoDB, or Graph Databases, etc. The database may be hosted at computing device 106, or alternatively, may be in network communication with the computing device 106 and hosted separately.

Referring next to FIG. 2, there is shown a computing device diagram 200 in accordance with one or more embodiments. The computing device 200 includes a communication unit 202, a display 204, a processor unit 206, a memory unit 208. The computing device 200 may further include an I/O unit 210 provided input/output at the computing device 200, a user interface engine 212 for providing user interfaces such as the one shown in FIG. 8 and a power unit 214 powering computing device 200.

The communication unit 202 operates to send and receive data via network 108 (see e.g. FIG. 1). This can include wired or wireless connection capabilities. The communication unit 202 can be used by the computing device 200 to communicate with other devices or computers. For example, the computing device 200 may use the communication unit 202 to communicate via network 104 with a user device 102.

The processor unit 206 controls the operation of the computing device 200. The processor unit 206 can be any suitable processor, controller or digital signal processor that can provide sufficient processing power depending on the configuration, purposes and requirements of the computing device 200 as is known by those skilled in the art. For example, the processor unit 206 may be a high-performance general processor. In alternative embodiments, the processor unit 206 can include more than one processor with each processor being configured to perform different dedicated tasks. In alternative embodiments, it may be possible to use specialized hardware to provide some of the functions provided by the processor unit 206. For example, the processor unit 206 may include a standard processor, such as an Intel® processor, or an AMD® processor.

The processor unit 206 can also generate various user interfaces. The user interfaces may be user interfaces such as the one found in FIG. 8 providing user access to the features of application running on the computing device 200.

The computing device 200 may include a display 204 that may be an LED or LCD based display and may be a touch sensitive user input device that supports gestures. An output device may also be used, such as a voice based interface including Google® Home, Amazon® Alexa® or the like.

The I/O unit 210 can include at least one of a mouse, a keyboard, a touch screen, a thumbwheel, a track-pad, a track-ball, a card-reader, voice recognition software and the like again depending on the particular implementation of the computing device 200.

The power unit 214 can be any suitable power source that provides power to the computing device 200 such as a power adaptor or a rechargeable battery pack depending on the implementation of the computing device 200 as is known by those skilled in the art.

The memory unit 208 comprises software code for implementing an operating system 220, various programs 222, database 224, data object unit 226, QEDX construction unit 228, QEDX deconstruction algorithm unit 230, and QEDX file repository 232. To facilitate the search and retrieval of QEDX files, a QEDX file repository 232 (see e.g. DO 50 QEDX File repository in FIGS. 4A, 4B, and 5) may be used, and the repository may, for example, be the property of the DO owner, or an agent of the owner such as a consignment service. The repository may be searchable and indexable where the technology used can include, but is not limited to, indexing technology and database technology. The repository may be associated with a registry.

The memory unit 208 may include software code corresponding to the methods described herein. For example, software code corresponding to FIGS. 3, 4A, 4B, 5, 6A, 6B, and 7 may be stored in the memory unit 208 and executed on processor unit 206.

The memory unit 208 can include RAM, ROM, one or more hard drives, one or more flash drives or some other suitable data storage elements such as disk drives, etc. The memory unit 208 is used to store an operating system 220 and programs 222 as is commonly known by those skilled in the art. For instance, the operating system 220 provides various basic operational processes for the computing device 200. For example, the operating system may be an operating system such as Windows® Server operating system, or Red Hat® Enterprise Linux (RHEL) operating system, or another operating system.

The programs 222 include various programs 222 so that the computing device 200 can perform various functions such as, but not limited to, providing APIs, encryption, archival, encoding, file management, decoding, decryption, dearchival, verification, and other functions as necessary.

The database 224 may be the database 108 (see FIG. 1). This may include, for example, a Structured Query Language (SQL) database such as PostgreSQL, SQLite3, or MySQL, or a not only SQL (NoSQL) database such as MongoDB, or Graph Databases, etc. The database 224 may store Data Objects (DOs), records corresponding to DOs, recording records, QEDX data, references to the QEDX file repository 232, etc.

The data object unit 226, may provide for locating, distributing, and encrypting/decrypting DOs. The DOs may be included in QEDX files that may be traded in exchange for monetary benefits, for barter, or other types of compensation. The data object unit 226 may operate without requiring oversight by a centralized regulatory authority or distributed consensus system to establish trust in the transaction processes. The data object unit 226 may provide for data self-authentication. The data object unit 226 may provide encryption and decryption services based on the industry standard encryption technology.

The data objects (DO) unit 226 operates on DOs which include discrete bit stream units representing units of data materialized as units of data assets. The data objects unit 226 uses DOs related to individual entities in ways that make entity data rights associated with that data evident when ever the DO is accessed. These rights are asserted by transforming the DO(s) now recognized as data assets using QEDX file construction unit 228, called 'QEDX construction algorithm. The DO unit 226 may receive, create, edit, or delete DOs 25 such as those described in FIG. 3.

Figure 7:
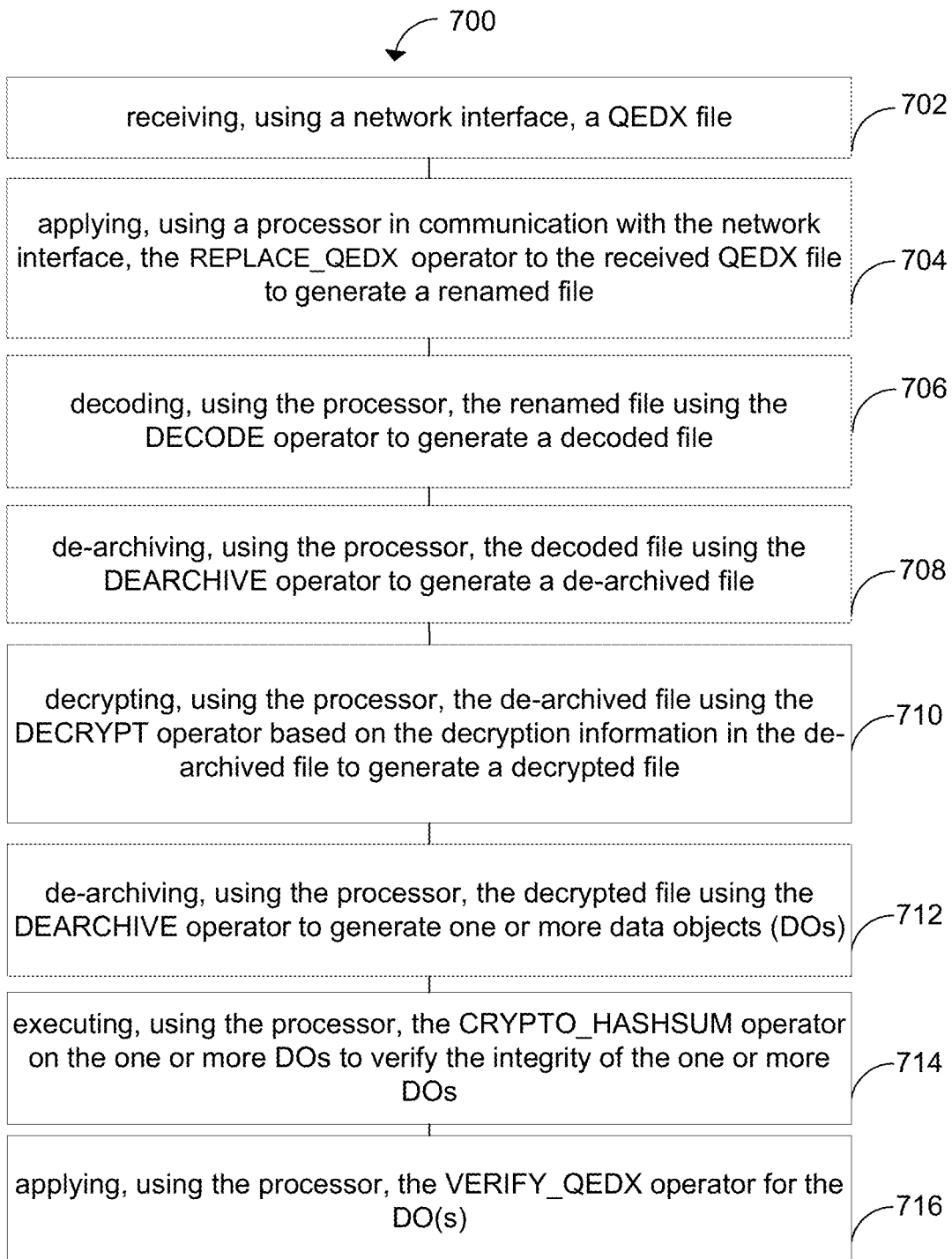
FIG. 7 is another method diagram in accordance with one or more embodiments.

The QEDX construction unit 228 may provide functionality such as the methods 4A, 5, 6A and FIG. 7 for generating and using QEDX files. These methods may permit users (or agents of the users) to agree to pre-specified transactional terms involving granting permission to use QEDX file content in ways that assert and respect specified property rights and use limitations. This utility may be implemented in a self-authenticating manner that does not require access to centralized certification authority systems or distributed consensus systems. These methods may provide an original, feasible and useful means of managing data encryption key and secrets such as passwords created to protect data privacy and property rights and implements a new file format that ensures verifiable data integrity and authenticity. The present embodiments may use industry standard encryption/decryption operations to enforce privacy and property rights.

The QEDX construction unit 228 may transform DOs into data assets that can be recognized in both material and dematerialized cyberspaces accessible via computer systems. QEDX files may be bought, sold, and re-sold in ways governed by the explicitly specified provenance, property rights and licensing terms set by the owner of the QEDX files (see e.g. FIG. 3). These activities are possible both within both centralized and decentralized platforms and/or via fully decentralized platforms controlled by individuals and any hybrid variation.

The QEDX construction unit 228 may establish property rights in digital assets and data objects which can be extended to the broader concept of an individual's identity. That identity may not be assigned but rather may emerges from particular circumstances and situations the individual has been exposed to. For example, an individual may assert property rights in a particular piece of personal information by storing it and evidence of their rights and their claims in a QEDX file that requires decryption instructions in order to be accessed.

The preservation of property rights of personal information is especially important in this era of machine learning, which can include, for example, deep fakes and facial recognition technology. For example, AI and ML technologies may combine to autonomously recognize and interpret biometric attributes that signal the identity of particular entities and objects, for example that use the digital image of a face to identify the owner of that face. Although facial recognition systems can be powerfully accurate, there are increasing ethical calls and legislative innovation aimed at ensuring the AI and ML based identification technology is not only valid but understandably valid. One application of the QEDX technology is its use providing a means for image owners to authorize others to use the image to design AL/ML models to counter fraudulent deep fake alterations of similar images that are deliberately designed to provide misleading and misinforming results outcome while respecting privacy legislation protected biometric ownership rights. To do so, the digital image (for example, of an individual's face) may be wrapped in a QEDX file and associated with instructions concerning how the image can be used with AI and ML model training and applications to identify faces in ways that ensure that the technology is trained using images which have been associated with explicit approvals to be used in such training and applications. Different entity specific unique biometrics such as voice, physical dimensions, and/or surface features like coloring or microbiome signatures, among other attributes, may be identified as representing the entity and stored in a QEDX file format. These entity specific unique biometrics may be offered to verify the accuracy of the identifications while recognizing the rights of the entity whose data is the subject of use by the AI and ML technology.

The QEDX file construction unit 228 provides for user specified rights and preferences, among other forms of preferences, to allow self-asserted identity, and other entity specific circumstantial factors, to be accounted for in determining what, when, where, why and how entity specific data can be used.

The QEDX construction unit 228 may store the generated QEDX file in database 224 or in the QEDX file repository 232.

The QEDX deconstruction unit 230 may provide functionality such as the methods 4B, 6B for deconstructing QEDX files, for example, after the QEDX file is transacted. The QEDX deconstruction unit 230 may store the generated QEDX file in database 224 or in the QEDX file repository 232.

The QEDX file repository 232 may be, for example, the QEDX file repository 50 (see FIGS. 4A, 4B, 6A, and 6B).

Figure 3:
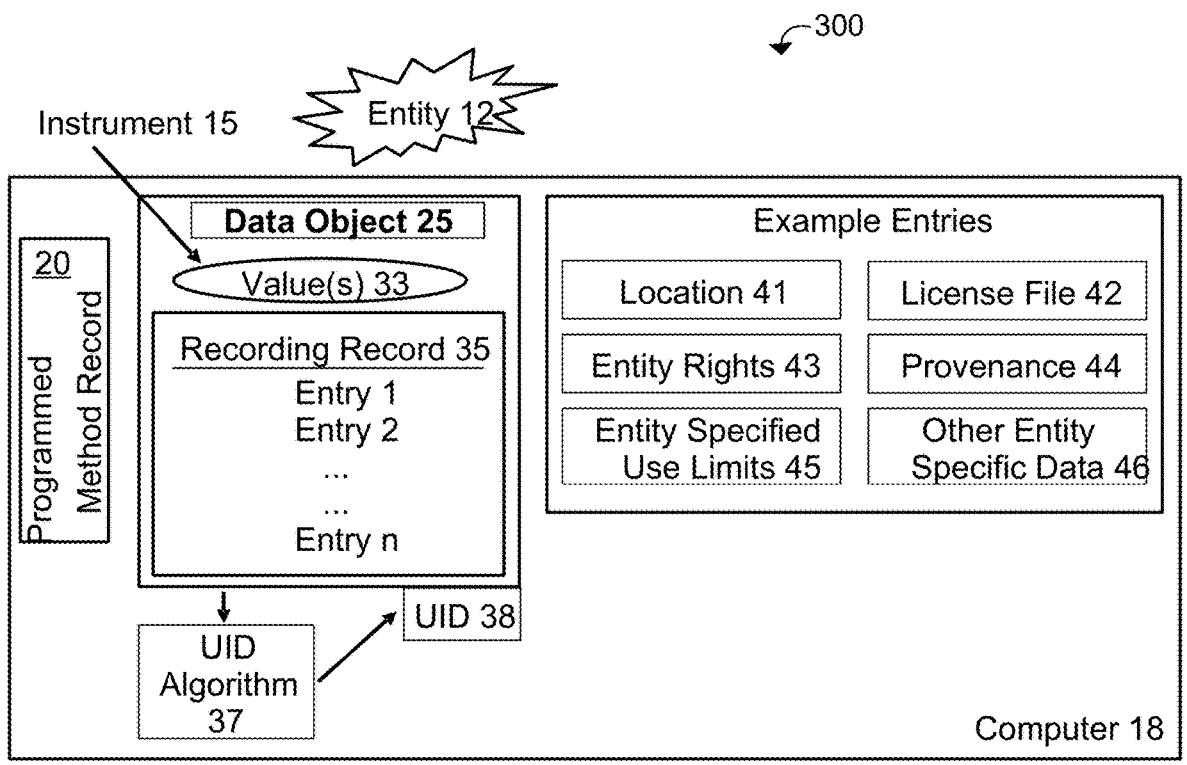
FIG. 3 is a self-authenticating Data Object Creation Event diagram in accordance with one or more embodiments.

Referring next to FIG. 3, there is shown a Data Object (DO) Creation Event diagram 300 in accordance with one or more embodiments.

Data objects 25 (herein after referred to as DOs) are discrete bit stream units representing units of data materialized as units of data assets in a file such as but not limited to a .zip file. The present embodiments described herein teach how to use DOs 25 related to individual entities in ways that recognize entity data rights associated with that data. Regardless of whether the entity is a person, group, or people, or even a robot or a computer generated virtual agent, if the entity can act autonomously then private data about them may be included in the data object, giving them rights related to the DO.

For example, data object 25 in FIG. 3 may include one or more signal values 33, a unique identifier 38 generated by a unique identifier algorithm 37 and an instrumental recording record 35 including one or more recording record entries specific to the original data value produced by instrument 15 to probe entity 12 with a programmed recording method 20 to generate signal values 33. Indeed, those instrumental recording specific recording record entries can be used to make the pairing of the instrumental recording record and the data signals self-authenticating as referenced in prior art. The recording record 35 can be also extended with entries asserting that the data ahs been acquired in a manner that respects use restrictions associated with the data values in DO 25.

For example, additional entries can be added to data object 25 that communicate data rights associated with the data signal values and the recording record. These can include, for example, a location 41, a license file 42, entity rights 43, provenance information 44, entity specified use limits 45, and other entity specific data 46, useful in evaluating and licensing rights connected to the data.

The identity and circumstances of different types of data and their intersection with different classes of data rights may have distinctive impacts on how entity specific data can be used and how data rights associated with that data can be asserted and regulated. Hence, there may be a plurality of ways that data ownership rights, such as but not limited to the right to grant permission to use such entity specific data, can be identified, interpreted, instantiated and investigated. The use of encryption technology allows data rights holder to assert those rights and the use of data a self-authentication technology allows data asset seekers to trust that they are receiving the data they are seeking.

For example, one non-limiting example of an application of the system and methods of the present embodiments involves generation of self-authenticated ownership right claims associated with the rights of other entities to examine data about the data right holder for commercial purposes, such as for targeting advertisement campaigns at entities the data are about. How those rights are asserted also will be dependent on the type of entity that owns the data and the jurisdiction in which the data is to be used. For data to be used legally and ethically, in for example Canada, the USA, the EU, there is a utility to associate entity specific data with ownership claims and permitted use preferences, in a manner compliant with specified for example, in privacy protection legislation.

The embodiments described herein were developed with the intention of allowing, among other forms of preferences, to allow self-asserted identity, and other entity specific circumstantial factors, to be accounted for in determining what, when-where, why and how entity specific data can be used. Segmentation along entity identity and recording circumstance attributes is at the core of many technologies including artificial intelligence (AI) and machine learning (ML) methodologies applied to sets of data. Those factors determine the value of data units in data markets. The embodiments described herein were developed with the intention of allowing entities that data are about to exert data rights associated with being the entity that data are about or being responsible for overseeing how such entity specific data can be used.

Transformation caused by that materialization opens the possibility for DOs to be privately owned like any other physical asset. The embodiments described herein teach how materialization of private entity specific data bit streams as owned data assets in ways that are deemed to be useful because they allow the creation of, for example, data assets and products.

One example use of identity specific DO asset assets is that private entity-specific DOs may supply valuable information for completing an analysis, or making a judgment, about relations between the entity that data is about and system situations, processes, outputs and outcomes experienced by that entity. For example, private data about an entity's prior responses to marketing offers can be included in the data asset record 35 and used to model and predict consumer preferences and the likelihood of that consumer responding to similarly advertised offers in the future.

The same sort of longitudinal analysis of entity specific private DOs also may be applied to analysis of adverse or desired responses of an entity that is a person being vaccinated or prescribed medication to comply with public health advice. Private personal DOs can be used to predict the value of a public health intervention associated and drive learning system models concerned with increasing public health benefits while reducing public health costs.

Each DO 25 may include a recording record 35 including one or more entries, and a value 33. Entries may contain metadata information about the corresponding value 33, such as contextualization information. For example, metadata may include descriptions of how the value was generated, various interpretations of the value and reasons therefore, what the value means to either primary or secondary users of the data and so on.

The unique identifier (UID) 38 may include an alphanumeric unique identifier generation to create DOs that contain authentication information. Generating unique identifiers from the metadata and value data may allow consumers to verify the contents of the DO.

Each DO 25 may be include any type of file from a single file containing zero or more bytes to an archive containing many other DOs. A DO may be an image file, a backup of a file system, a tar archive or a zip archive. An executable computer program can be a DO as can any health care record or automotive repair record. The DO may also include an extensive set of files such as the license under which, for example, the DO may be used and relicensed. This list of potential DOs is not exhaustive but rather only provides examples. Any digital asset may be considered a DO. The present embodiments teach how to generate, and to register unique DO identifiers for use in integrity checks on physically embodied DO bit streams.

The present embodiments describe methods that allow any set of DOs, representing instances of any type of DO, at any level of granularity, to be created in a manner that facilitates informatic: location, search, retrieval, analysis, and utilization of DO contents. Self-authenticating checks of DO integrity builds confidence in the datasets made up of one or more DOs. Encryption technology is used to enforce property rights. The methods specified here accomplish that utility, while simplifying logistics of using and re-using DO contents while asserting data property rights that permit or limit how DO data are used.

The specified embodiments may permit entities-(including but not limited to corporations, groups, people, persons, artificial life forms, artificial groups and entity hybrids)—to establish property rights on the data about themselves and data that they legally and transparently purchase and/or license from other entities. These embodiments may permit entities to establish property rights on data created in, including but not limited to: virtual reality worlds, extended reality worlds, augmented reality worlds, hybrid reality worlds and the real world.

The present embodiments include methods that may be applied to both commercial digital properties and personal digital properties with equal ease and utility and in ways that open new markets that benefit, including but not limited to, data property rights holders, seekers of data properties and agents for these entities.

For example, where an image file represents a particular frame of a copyrighted master copy of a commercial movie production. The frame and any one or more of its pixels may be specified as being a part of that movie master copy by including the unique identifier of a DO 25 containing the movie master copy. Unique identifiers 48 of DOs 25 specifying a single pixel, a single frame of a master copy of a movie, containing that frame, containing that pixel, may serve as identifier tokens for enabling commercial transactions to be carried out involving, among others certifying, marketing, selling, renting, and/or sharing parts of the master copy down to a set of one or more specific pixels. The same approach may be applied to marketing the right to use a lyric of a copyrighted song in a written format on a website or applied in ways that allow patients to authorize use of a part of their patient record for purposes outside those for which the data were recorded. Other equivalent applications can be imagined.

Referring together to FIGS. 4A, 4B, 5, 6A, and 6B, systems and methods for construction and deconstruction of QEDX files are described.

The particulars of the providence, intellectual property rights and licensing rights which may be detailed in the QEDX files include information and rights relating to, but not limited to, four applied knowledge domains, namely:

1) specifying—creating systems of explicit and easily indexed, locatable, and verifiable identifiers of DO(s) such that the data associated with the DO(s) can be reliably and precisely incorporated into data products in a trustworthy manner.
2) making—allowing makers to register and communicate how specific products, like but not limited to goods and services, are produced and what steps and choices were made in that production process;
3) transacting—supporting accountable methods for relating, representing, and specifying transactions between producers and consumers, buyers and sellers, and;
4) governing—supporting implementation of accountable systems for regulating production, distribution, and consumption of products, services, and activities; meeting regulatory requirements specified by privacy legislation including, but not limited to, the California Privacy Rights Act, the California Consumer Privacy Act and the Virginia Consumer Data Protection Act, among others.

For example, consider a market for artisan products. The value of the artisan product reflects how and why such products are produced as much as the commodity value based on what they are made of and where they are produced. The specified embodiment allows the capture of the what-, where/when-, why-, and how-data, among others types of data, related to, for example, the production of the artisan product. This captured data concerning the enabling processes, are then linked to the to the artisan via the QEDX file format. This means the QEDX file format provides a virtual product packaging capability or utility.

The QEDX virtual product packaging utility may add value to a transaction such as the property's owner(s) contact information, as well as the data product's permitted uses, area of operations, licensing terms, re-licensing terms, usage period among others, can be completely specified and made accessible to those seeking to gain access to the data product. This is of course a non-exhaustive specification of the QEDX file format's value adding capabilities.

The QEDX file framework described herein may use encryption methods (i.e. the ENCRYPT operator), such as but not limited to symmetric and asymmetric encryption methods, in a manner that allows data rights holder to take possession of data they have rights to and to regulate access to that data. The methods, systems, and processes herein may operate independent of other data format frameworks, including but not limited to the standard file format types such as the tagged image file format (TIFF). This functionality may be made available in a web browser-based user interface and may function for a variety of user device operating systems, including the Linux and Windows systems. The web browser user interface is but one example and many other user interfaces are possible. The use of encryption technology allows a data owner to assert their property rights.

There are situations where packaging DOs (such as DO 25 in FIG. 3) with data concerning circumstances specific to a given DO such as: 1) who owns the DO; 2) what DOs are about and where they are located; 3) when/where specific DOs were generated; 4) why and how DOs were created; 5) how, where and when the DOs can be used-(licensing terms); 6) specified dispute resolution procedures; and 7) the method of completing the transaction and receiving means of decrypting the data in exchange for allowing confirmation that all terms of the transaction have been completed.

The present embodiments may function in a variety of situations, for example where a guarantee of privacy and confidentiality rights is desirable or required. In such cases, additional data associated with the DO may be verified and acknowledged for value to be extracted and processed from accessing the DO over and above the technical details of how the data was generated. Such situations may include data consignment markets for aggregated copies of personal DOs, where the data is used in ways that comply with pre-specified governance, ethical, legal, societal and transactional constraints. This accommodation of those constraints may be made possible through the use of encryption technology to impose property rights.

The present embodiments may be implemented using available cyber-infrastructure in transformative, unique, original, and pre-specified ways. The specified QEDX file format ensures, among other things, that the identity, authenticity, and ownership of that DO can be determined in a way that data owners are able to exercise rights associated with that ownership and potential users are protected from misappropriating and misusing those properties. The use of encryption technology in the QEDX file format ensures that both data owners and data users are bound by pre-specified legally binding agreements and protected from unintended consequences.

The present embodiments may enable progressive extension of DO properties through packaging with flexible sets of additional instructions implemented through operators that transform the archives containing the DO(s). That transformation may, for example, automatically append an extension to the end of the file name. Hence at the end of these series of transformations, the list of extensions will be a map of those transformations.

Those series of transformations may be implemented through a process of staged, sequential containment of a given DO. The contained bit stream asset that is identified, self-authenticating, encrypted, and owned, may cooperate with the methods and systems herein without requiring access to, or interpretation of, the bit stream's information content. The result is a new file structure for containing archived, encrypted, and encoded DOs over which ownership is asserted. Those transformations may be used in transactions involving, among others, conveyance of a specific DO bit stream having value known to agents involved, who have, prior to receiving file decryption instructions have entered into a transactional agreement regarding the terms associated with that conveyance. This may ensure that the user of the QEDX file has recognized both the specified and implied property rights of the data owner.

The construction and deconstruction of a QEDX file may use a set of operators. Construction may involve applying a number of steps, each applying a specific operator: 1) the CRYPTO_HASHSUM operator; 2) the ARCHIVE or DEARCHIVE operators; 3) the ENCRYPT or DECRYPT operators, 4) the ENCODE or DECODE operators, 5) the RENAME QEDX or REPLACE QEDX operators. Following completion of each of these steps a final step, 7) CLEANUP operator may be applied to insure no sensitive information is, for example, left behind.

The operators—(ARCHIVE, ENCRYPT, ENCODE) may generate DOs with specific file endings. This may create a map of the processing of the DO as it becomes a QEDX file. Other transformative operators may be applied to the DOs. Similarly, this map may specify what needs to be done to deconstruct a QEDX file, in order to access the embedded DOs.

The CRYPTO_HASHSUM operator may be used to calculate the cryptographic hash sum of a DO where the cryptographic algorithm used can for example include, but is not limited to, the whirlpool cryptographic hash function or the BLAKE3 cryptographic hash function. The CRYPTO_HASHSUM operator may include hashsums of hash types 'adler32', 'crc64', 'crc32', 'crc32rfc1510', 'crc24rfc2440', 'md4', 'md5', 'ripemd160', 'sha1', 'sha224', 'sha256', 'sha512', 'sha384', 'tiger192', 'tiger', 'tiger2', 'whirlpool', and others as are known.

The ARCHIVE operator may be used to create archives from one or more DOs where the archive technology used can include but is not limited to zip technology, 7Zip technology, tar technology. Archive operators also can offer other protection mechanism including but not limited to password protection. If password protection is for example used then a password is needed to open the archive. The archive(s) produced by the ARCHIVE operator is a DO.

The DEARCHIVE operator may be used to de-archive existing archives containing one or more DOs where the archive technology used can include but is not limited to zip technology, 7Zip technology, tar technology. If password protection is for example used then the DEARCHIVE operator will need the password used to protect the archive in order to de-archive the archive. In this case the DEARCHIVE operator will need the other protection mechanisms used by the ARCHIVE operator.

The ENCRYPT operator may be used to encrypt DOs where the encryption technology used can include but is not limited to symmetric encryption and asymmetric encryption. The set of encryption algorithms may include, but are not limited to, AES_GMAC, AES_128_CCM, AES_256, GCM, AES_256_CCM. The ENCRYPT operator will produce an encrypted DO. The present embodiments may use an encryption algorithm that requires a password. This of course means that this same password and algorithm must be used by the decryption operator.

The DECRYPT operator may be used to decrypt an encrypted DO. Depending on the encryption technology the decryption operator may need keys, passwords or both. The DECRYPT operator will yield a decrypted DO. The present embodiments may use an encryption algorithm that requires a password. This of course means that this DECRYPTION operator must use the same password and algorithm used by the ENCRYPTION operator.

The ENCODE operator may be used to encode a DO where the encoding technology used can include, but is not limited to, base64 encoding.

The DECODE operator may be used to decode an encoded DO where the decoding technology used can include but is not limited to base64 decoding. This means the decode operator, decodes, for example, a base64 encoded DO.

The RENAME_QEDX operator may be used to rename a QEDX file. If for example, the archive technology being used is zip archive technology, this operator replaces the following file ending ".zip.zip.enc.zip.encoded" with a ".qedx". If the archive technology being used is tar archive technology, this operator replaces the following file extension ".tar.tar.enc.tar.encoded" with a ".qedx" extension.

The REPLACE_QEDX operator may be used to replace the .qedx extension with the extension needed to enable deconstruction. If, for example, the archiving technology being used is zip archive technology, this operator replaces the following file extension ".qedx" with ".zip.zip.enc.zip.encoded". If the archiving technology being used is tar archive technology, this operator replaces the following file extension ".qedx" with "tar.tar.enc.tar.encoded".

The VERIFY_QEDX operator may be used to verify that the cryptographic hash value of the DO(s) in a deconstructed qedx file matches the cryptographic hashsum of the DO calculated when the QEDX was created. This operator yields true or false with a true value indicating that the DO (s) within the QEDX file has not been altered.

The CLEANUP operator may be used to remove the intermediate DOs generated on the way to creating a QEDX file. The CLEANUP operator prevents sensitive DOs from remaining on, for example, a computing device after the QEDX file is created.

The NETWORK operator may be used to move a DO from one computation device to another via networking technology including, but not limited to, wifi, bluetooth, ethernet, token-ring technology.

Figures 4A, 4B:
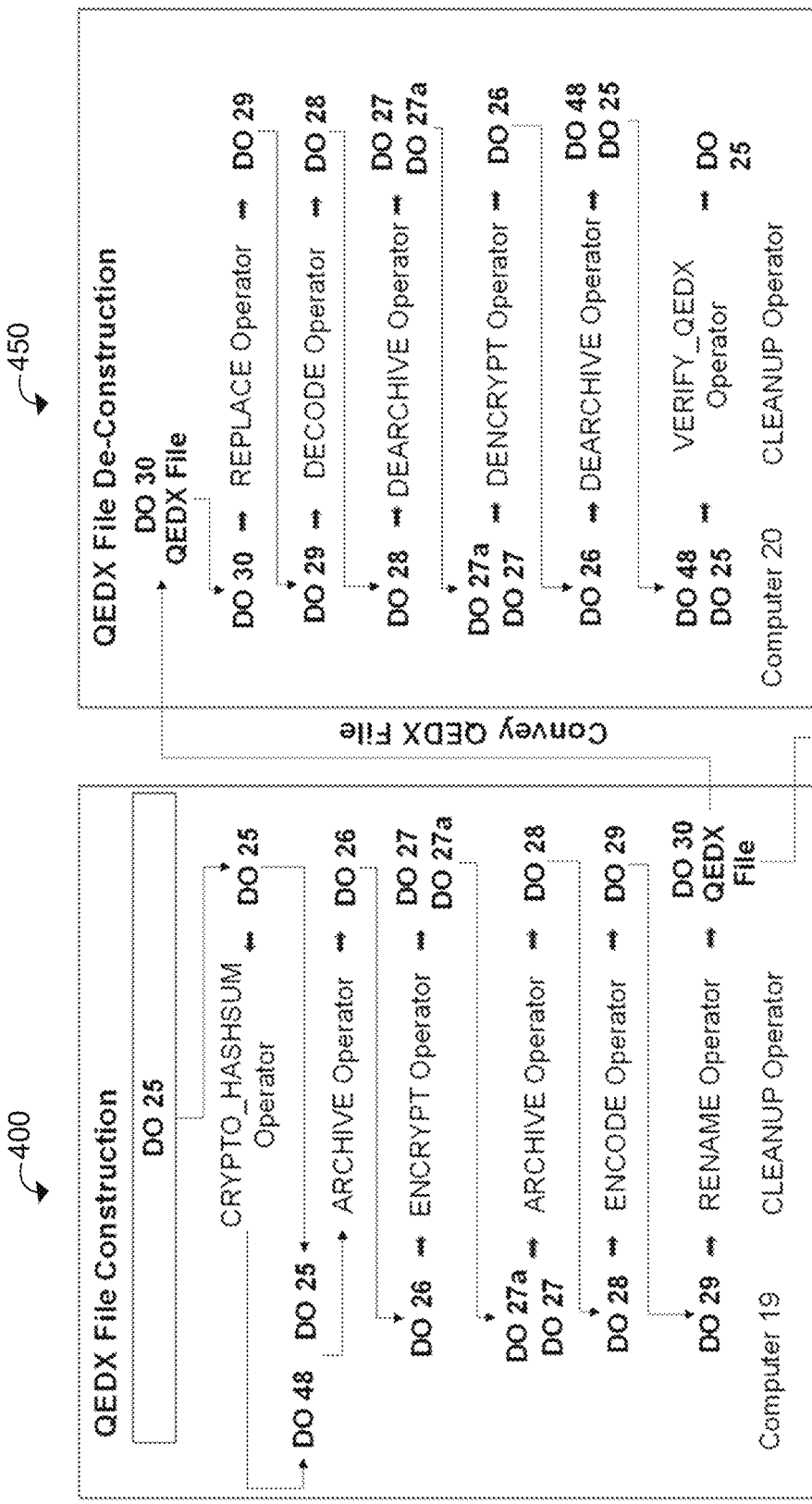
FIG. 4A is a QEDX File Construction diagram in accordance with one or more embodiments.
FIG. 4B is a QEDX Data Deconstruction diagram in accordance with one or more embodiments.

Referring next to FIG. 4A, there is shown a QEDX File Construction diagram 400 in accordance with one or more embodiments. A QEDX file may be constructed as follows:
  i) Applying a CRYPTO_HASHSUM operator to DO 25 to yield DO 48.
  ii) Applying the ARCHIVE operator to DO 48 and DO 25 to yield DO 26.
  iii) Applying the ENCRYPT operator to DO 26 yielding DO 27 and DO 27*a*. The ENCRYPT operator may include encrypting DO 27 and providing information needed to decrypt DO 27 in DO 27*a*.
  iv) Applying the ARCHIVE operator to DO 27 and the information needed to decrypt DO 27 found in DO 27*a* to yield DO 28, for example, using an archive command such as 'tar', 'zip', or others as are known.
  v) Applying the ENCODE operator to DO 28 yielding DO 29.
  vi) Apply the RENAME_QEDX operator to DO 29 yielding DO 30 which is a QEDX file.
  vii) Applying the CLEANUP operator to remove unprotected, sensitive information on the computing device.

Referring next to FIG. 4B, there is shown a QEDX Data Deconstruction diagram 450 in accordance with one or more embodiments. The QEDX deconstruction may be performed by a recipient of the QEDX file in order to access the original DO 25 and DO 48 the target QEDX file (for example, the QEDX file generated in QEDX file construction 400, see FIG. 4A) is de-constructed.

The deconstruction 450 may use the following set of operators:
  i) applying the REPLACE_QEDX operator on the DO 30 to generate DO 29.

ii) applying the DECODE operator on DO 29 to generate DO 28.
iii) applying the DEARCHIVE operator on DO 28 to generate DO 27 and 27a.
iv) applying the DECRYPT operator on DO 27 and 27a to generate DO 26.
v) applying the DEARCHIVE operator on DO 26 to generate DO 48 and DO 25.
vi) applying the VERIFY_QEDX operator on DO 48 and DO 25 to verify the hash of the DO 25.

In one embodiment, an agent such as a human user at a user device provides a protection token during the QEDX creation, for example a protection token such as a password. The password may be used by the underlying encryption algorithm in the ENCRYPT operator. The use of a different algorithm in the ENCRYPT operator may include the use of a different protection token and a password may, depending on the selected encryption algorithm, no longer be required. Other protection tokens may include but are not limited to, biometric measures such as voiceprints, fingerprints, or other biometric information as known.

When the QEDX file is decrypted the same protection token, such as a password, is supplied by the user at the user device to the decryption algorithm. Public-key/private-key infrastructure may be used to address the challenge of key management challenge and a private key does not need to be shared between users to share encrypted information.

QEDX technology may enable the assertion of property rights over the data contained in the associated DOs, and this may be accomplished by building archives that contain the data. The mechanisms used to assert those property rights over the archives may be, but are not limited to, encryption technology and passwords. It is understood as well that, the QEDX technology may recognize new property right enforcement technologies as they emerge. In the case of passwords, the archive can be protected by passwords which are made up of alpha-numeric characters. It is also recognized that other mechanisms such as biometric identifiers and other multi-factor authentication mechanisms may also be used to limit access to the archives.

Each created archive file within the QEDX file can be password protected. Since the above described process creates two archive files, this means two password protected archives may be created which in turn means two passwords are needed for the associated QEDX file. If this practice is used then the resulting QEDX file would need two passwords in order to access the target DO.

The same password may be used multiple times for different archives within a QEDX file. This type of QEDX file, one that uses password protected archive files, may be suitable for the zero trust cybersecurity model as multiple different agents would, for example, have to provide passwords to access a critical DO.

The name of the QEDX file may be the same as the target DO, for example, DO 25. This means if, for example, DO 25 is called I1.jpg then the QEDX file may be called I1.jpg.qedx. In the case where the QEDX file is named differently from the target DO there may be a security risk including but not limited to, denial of access attacks. In one embodiment, strategies to allow the QEDX file name to be completely different from the target DO, may include a method allowing the external QEDX file name to be different from the target DO. This method may, for example, allow a user to specify via a user interface the desired name, generate a map file with the desired name and generate a QEDX with the desired name different from the target DO name. The map file may be incorporated into the QEDX file to allow the recovery of the original DO target name during a QEDX de-construction process.

Figure 5:
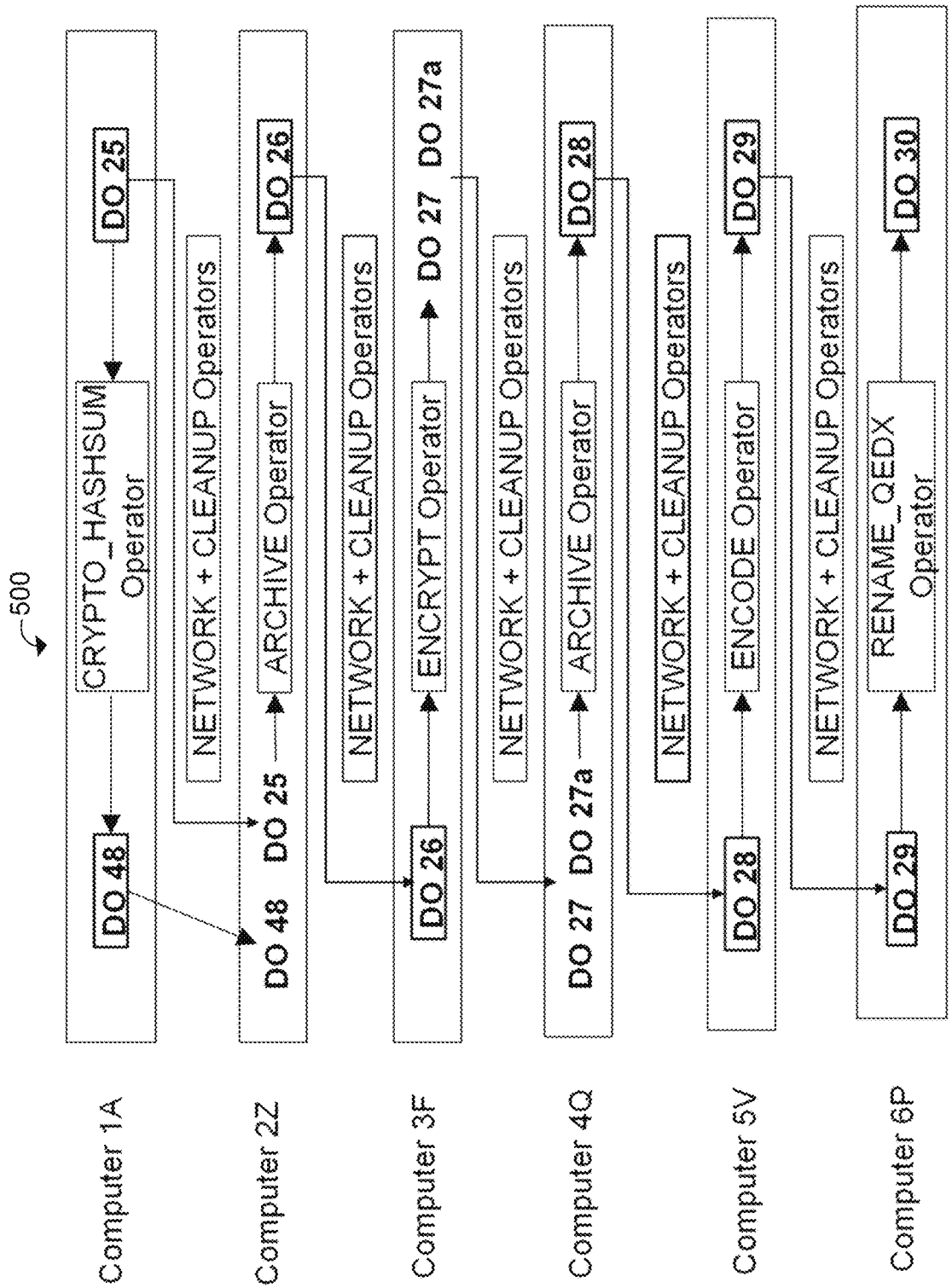
FIG. 5 is a Distributed QEDX File Construction diagram in accordance with one or more embodiments.

Referring next to FIG. 5, there is shown a Distributed QEDX File Construction diagram 500 in accordance with one or more embodiments.

The QEDX file may be constructed in a distributed network system where the needed computational steps are performed on separate compute platforms with the QEDX file created potentially on a different computer (for example, Computers 1A, 2Z, 3F, 4Q, 5V, and 6P). A hybrid of this scenario including a centralized system, and partial use of a distributed network system may also be used. The Deconstruction of a QEDX file may similarly be performed in a distributed manner.

FIG. 5 illustrates how a QEDX file can be created in a distributed fashion. To describe this distributed QEDX file creation, example network attached computing devices are provided for exposition purposes. For example, the following explanation uses computer 1A, computer 2Z, computer 3F, computer 4Q, computer 5V, computer 6P. The distributed creation of a QEDX file may happen over a variety of time frames including, but not limited to, as fast as possible given the compute infrastructure to, or in an alternate example, over a period of thirty days. This scenario may enable use of economical compute resources to create a QEDX file, for example but not limited to, taking advantage of peak load pricing opportunities (such as spot-instance pricing on Amazon AWS).

A QEDX file may be created in a distributed manner using the following steps:
i) Applying the CRYPTO_HASHSUM operator to DO 25 to yield DO 48 on computer 1A where DO 25 was placed on computer 1A using the NETWORK operator.
ii) Applying the NETWORK operator to move DO 25 and DO 48 from computer 1A to computer 2Z, applying the CLEANUP operator on DO 25 and DO 48 on computer 1A then applying the ARCHIVE operator to DO 25 and DO 48 and on computer 2Z to yield DO 26.
iii) Applying the NETWORK operator to move DO 26 from computer 2Z to computer 3F, applying the CLEANUP operator on DO 26 on computer 2Z then apply the ENCRYPT operator to DO 26 on computer 3F to yield DO 27 and DO 27a.
iv) Applying the NETWORK operator to move DO 27 and DO 27a from computer 3F to computer 4Q, applying the CLEANUP operator on DO 27 and DO 27a on computer 3F then applying the ARCHIVE operator to DO 27 and DO 27a on computer 4Q to yield DO 28.
v) Applying the NETWORK operator to move DO 28 from computing device 4Q to computer 5V, applying the CLEANUP operator on DO 28 on computer 4Q then applying the ENCODE operator to DO 28 on computer 5V to yield DO 29.
vi) Applying the NETWORK operator to move DO 29 from computer 5V to computer 6P, applying the CLEANUP operator on DO 29 on computer 5V then applying the RENAME_QEDX operator to DO 29 on computer 6P to yield DO 30, the QEDX file.

The amount of distributed computing may vary based on users discretion. A QEDX file may consist of DOs transformed by at least the following set of operators: ARCHIVE, CRYPTO_HASHSUM, ENCODE and RENAME_QEDX operators. In one or more embodiments, the ENCRYPT operator may be used to protect the property rights on DOs. In some jurisdictions and situations however strong encryption may not be permitted or desired, and thus different ENCRYPT operations may be used as needed.

The method 500 may be a useful for the transformation of a DO via archiving, encryption and encoding in a simple, straightforward manner that yields a new DO that can be moved through any communication channel. The distributed functionality may be independent of any central authority, any communication platform, and any operating system.

Figure 6:
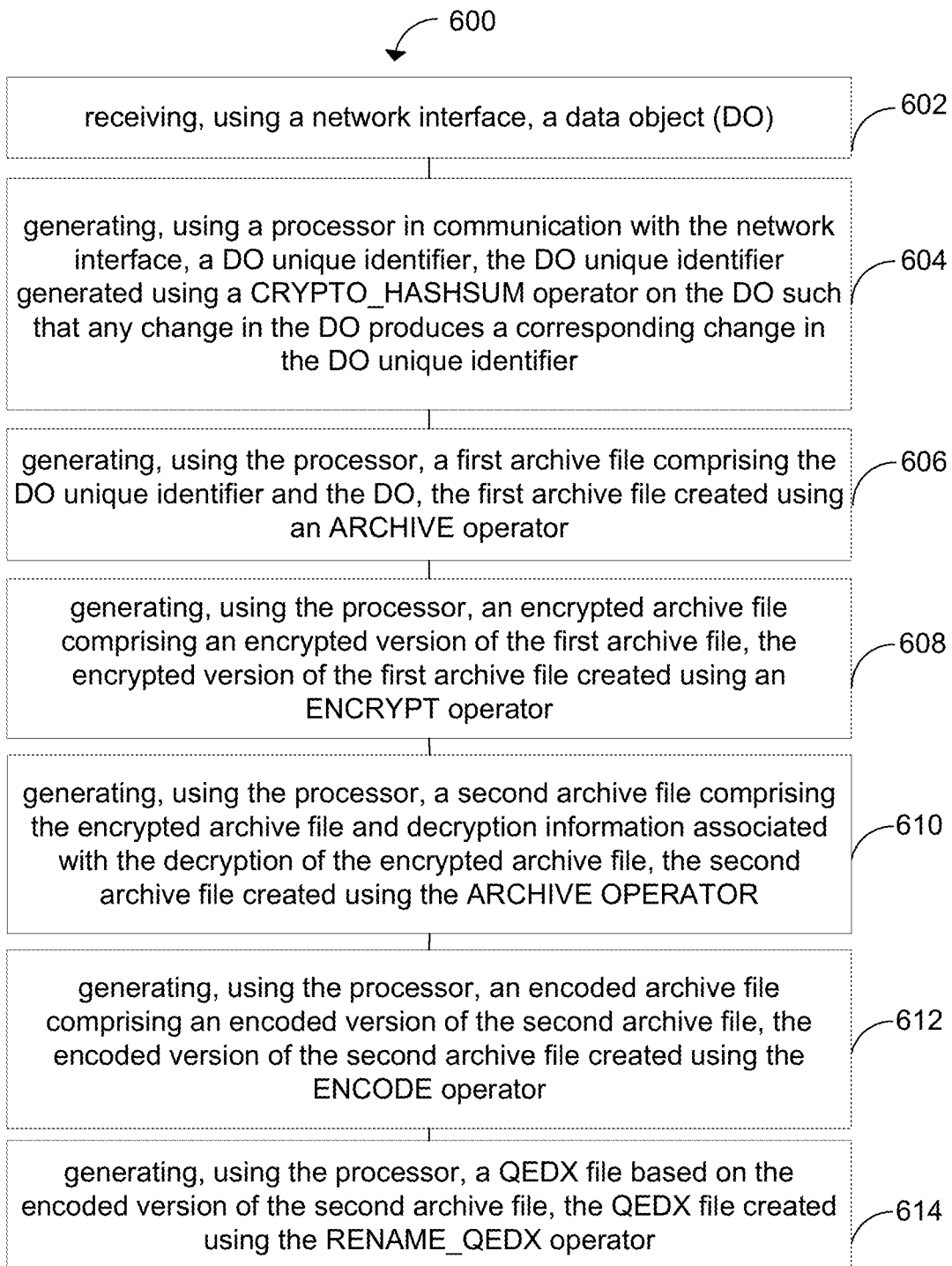
FIG. 6 is a method diagram in accordance with one or more embodiments.

Referring next to FIG. 6, there is shown a method diagram 600 in accordance with one or more embodiments.

At 602, receiving, using a network interface, a data object (DO).

At 604, generating, using a processor in communication with the network interface, a DO unique identifier, the DO unique identifier generated using a CRYPTO_HASHSUM operator on the DO such that any change in the DO produces a corresponding change in the DO unique identifier.

At 606, generating, using the processor, a first archive file comprising the DO unique identifier and the DO, the first archive file created using an ARCHIVE operator.

At 608, generating, using the processor, an encrypted archive file comprising an encrypted version of the first archive file, the encrypted version of the first archive file created using an ENCRYPT operator.

At 610, generating, using the processor, a second archive file comprising the encrypted archive file and decryption information associated with the decryption of the encrypted archive file, the second archive file created using the ARCHIVE OPERATOR.

At 612, generating, using the processor, an encoded archive file comprising an encoded version of the second archive file, the encoded version of the second archive file created using the ENCODE operator.

At 614, generating, using the processor, a QEDX file based on the encoded version of the second archive file, the QEDX file created using the RENAME_QEDX operator.

Optionally, the method may further include: executing, using the processor, the CLEANUP operator.

Optionally, the method may further include: storing, in a storage device in communication with the processor, the QEDX file in an indexable and searchable repository, the indexing configured to make the QEDX file findable in a search of the repository.

Optionally, the indexable and searchable repository may be in network communication with the processor using the network interface.

Optionally, the associating, at the processor, in an archive file the DO unique identifier and the provided DO may comprise: associating, using the processor, in an archive file the DO unique identifier, the provided DO and the file that maps the QEDX file name to the provided DO.

Optionally, the method may further include: transmitting, using the network interface, the DO unique identifier and the DO using the NETWORK operator to a first different computation device; and executing, using the processor, the CLEANUP operator to remove the DO unique identifier and the provided DO.

Optionally, the method may further include: transmitting the first archive file using the NETWORK operator to a second different computation device; and applying the CLEANUP operator to remove the first archive file.

Optionally, the method may further include: transmitting the encrypted archive file and the decryption information file created in the previous step using the NETWORK operator to a third different computation device; and applying the CLEANUP operator to remove the encrypted archive file and the decryption information file.

Optionally, the method may further include: transmitting the second archive file to a fourth different computation device; and applying the CLEANUP operator to remove the archive file.

Referring next to FIG. 7, there is shown another method diagram 700 in accordance with one or more embodiments.

At 702, receiving, using a network interface, a QEDX file.

At 704, applying, using a processor in communication with the network interface, the RENAME_QEDX operator to the received QEDX file to generate a renamed file.

At 706, decoding, using the processor, the renamed file using the DECODE operator to generate a decoded file.

At 708, de-archiving, using the processor, the decoded file using the DEARCHIVE operator to generate a de-archived file.

At 710, decrypting, using the processor, the de-archived file using the DECRYPT operator based on the decryption information in the de-archived file to generate a decrypted file.

At 712, de-archiving, using the processor, the decrypted file using the DEARCHIVE operator to generate one or more data objects (DOs).

At 714, executing, using the processor, the CRYPTO_HASHSUM operator on the one or more DOs to verify the integrity of the one or more DOs.

At 716, applying, using the processor, the VERIFY_QEDX operator for the DO(s).

Optionally, the decryption may further include: receiving a private key from a user device; and verifying that a public key associated with the QEDX file and private key pair match.

Optionally, the decryption may further include: receiving a user password from a user device; and verifying the user password by decrypting the QEDX file using the user password.

Figure 8A:
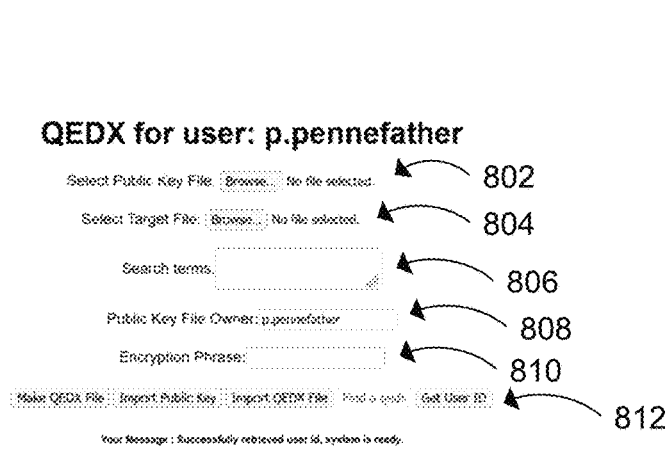
FIG. 8A is a user interface in accordance with one or more embodiments.

Referring next to FIG. 8A, there is shown a user interface diagram 800 in accordance with one or more embodiments.

The user interface 800 may be a web page or a portion of a web page provided by computing device 106 (see FIG. 1) to a user in order for the user to generate a QEDX file (as described in FIG. 4A). The user interface 800 may include a public key control 802, a target file or DO control 804, a search term control 806, a public key file owner control 808, a password phrase control 810, and a plurality of button controls 812.

The public key control 802 may enable a user to select a public key file for QEDX creation.

The target file or DO control 804 may enable a user to select one or more DOs for inclusion in the created QEDX file.

The search term control 806 may enable a user to identify one or more recording record entities (see e.g. record 35 in FIG. 3) which may identify entity information associated with the created QEDX file.

The public key file owner control 808 may enable a user to identify the user associated with the public key file provided in control 802.

The password phrase control 810 may enable a user to enter a password phrase associated with the created QEDX file.

The plurality of button controls 812 may include buttons for operating the server and initiating the creation of the QEDX file. For example, buttons may include a 'make QEDX file', 'import public key', 'import QEDX file', 'find QEDX', and 'get user id'.

Figure 8B:
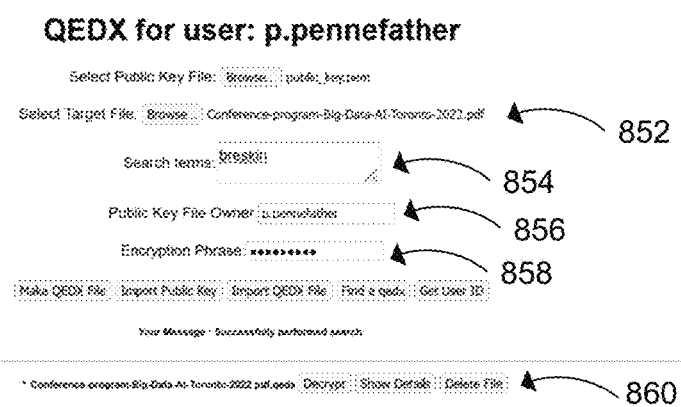
FIG. 8B is another user interface in accordance with one or more embodiments.

Referring next to FIG. 8B, there is shown a user interface diagram 850 in accordance with one or more embodiments.

The user interface 850 may be a web page or a portion of a web page provided by computing device 106 (see FIG. 1). In user interface 850, a user may have uploaded a received QEDX file 862 to the server for deconstruction (as described in FIG. 4B). The user interface 800 may include a target file control 852, a search term control 854, a public key file owner control 856, and a password phrase control 858. Additionally, the user interface 850 includes a file listing 860 of the user's QEDX files including respective operations.

The target file control 852 may be updated to indicate the DO uploaded to the server for inclusion in the QEDX file.

The search term control 854 may include one or more entity specific records for association with the QEDX file. The search term control 854 may also specify a search query to retrieve a user's QEDX files stored on the server.

The public key file owner control 856 may enable a user to identify the user associated with the public key file provided.

The password phrase control 858 may be completed to enter the password phrase associated with the created QEDX file.

The file listing 860 of the user's QEDX files including respective operations, such as deconstructing the QEDX file, showing details of the QEDX file, and deleting the QEDX file.

The present invention has been described herein by way of example only. Various modification and variations may be made to these exemplary embodiments without departing from the spirit and scope of the invention, which is limited only by the appended claims.

We claim:

1. A method of creating a data file, the method comprising:
   receiving, an initial data object (DO), the initial DO comprising a combination of a digital data file and additional data object data, the additional data object data comprising data object rights data defining data rights and/or restrictions associated with the data object;
   generating, using a processor, a DO unique identifier, the DO unique identifier generated by applying a hash function operator on the initial DO, wherein the DO unique identifier is generated by applying the hash function operator on the combination of the digital data file and the additional data object data;
   generating, using the processor, a first archive file comprising the DO unique identifier and the initial DO, the first archive file created using an ARCHIVE operator;
   generating, using the processor, an encrypted version of the first archive file, the encrypted version of the first archive file created using an ENCRYPT operator;
   generating, using the processor, a second archive file comprising the encrypted archive file and decryption information associated with the decryption of the encrypted archive file, the second archive file created using the ARCHIVE operator;
   generating, using the processor, an encoded archive file comprising an encoded version of the second archive file, the encoded version of the second archive file created using the ENCODE operator;
   generating, using the processor, a QEDX file by applying a RENAME QEDX operator on the encoded version of the second archive file, wherein the RENAME QEDX operator modifies a file extension of the encoded version of the second archive file;
   storing the QEDX file in a non-transitory storage memory by storing, in a storage device in communication with the processor, the QEDX file in an indexable and searchable repository, the indexing configured to make the QEDX file findable in a search of the repository; and
   executing, using the processor, a CLEANUP operator to ensure removal of the initial DO and the DO unique identifier and removal of any intermediate data objects generated during the process of generating the QEDX file;
wherein,
generating the first archive file, generating the encrypted version of the first archive file, generating the second archive file, and generating the encoded archive file progressively appends a set of appended file extensions to generate the file extension of the encoded version of the second archive file; and
prior to applying the RENAME QEDX operator on the encoded version of the second archive file, the file extension of the encoded version of the second archive file defines a map identifying a sequence of processing operations required to enable deconstruction of the QEDX file.

2. The method of claim 1, wherein the indexable and searchable repository is in network communication with the processor using the network interface.

3. The method of claim 1, wherein the indexable and searchable repository is connected using a serial interface to the processor.

4. The method of claim 1, wherein the method of claim 1 is performed by two or more computing devices, the method further comprising:
   transmitting, using the network interface, the DO unique identifier and the initial DO to a first different computation device; and
   executing, using the processor, the CLEANUP operator on each of the two or more computing devices to remove the DO unique identifier and the initial DO.

5. The method of claim 1, wherein the initial DO is received over a network connection and stored in a local attached memory.

6. The method of claim 1, wherein the additional data object data comprises an initial data object unique identifier, the initial data object unique identifier generated by applying an additional hash function operator on an underlying data object, wherein the initial data object is derived from the underlying data object.

7. A system for creating a data file, the system comprising:
   a memory;
   non-transitory local data storage in communication with the memory, the local data storage configured to receive and store an initial data object (DO), the initial DO comprising a combination of a digital data file and additional data object data, the additional data object data comprising data object rights data defining data rights and/or restrictions associated with the data object;
   a processor in communication with the memory and the local data storage, the processor configured to:
      generate a DO unique identifier, the DO unique identifier generated by applying a hash function operator on the initial DO, wherein the DO unique identifier is generated by applying the hash function operator on the combination of the digital data file and the additional data object data;
      generate a first archive file comprising the DO unique identifier and the initial DO, the first archive file created using an ARCHIVE operator;

generate an encrypted archive file comprising an encrypted version of the first archive file, the encrypted version of the first archive file created using an ENCRYPT operator;

generate a second archive file comprising the encrypted archive file and decryption information associated with the decryption of the encrypted archive file, the second archive file created using the ARCHIVE operator;

generate an encoded archive file comprising an encoded version of the second archive file, the encoded version of the second archive file created using the ENCODE operator;

generate a QEDX file by applying using a RENAME QEDX operator on the encoded version of the second archive file, wherein the RENAME QEDX operator modifies a file extension of the encoded version of the second archive file;

store the QEDX file in a non-transitory storage memory by storing the QEDX file in an indexable and searchable repository stored by a storage device in communication with the processor, the indexing configured to make the QEDX file findable in a search of the repository; and execute a CLEANUP operator to ensure removal of the initial DO and the DO unique identifier from the memory and removal of any intermediate data objects generated during the process of generating the QEDX file;

wherein, the processor is configured to progressively append a set of appended file extensions to generate the file extension of the encoded version of the second archive file by generating the first archive file, generating the encrypted version of the first archive file, generating the second archive file, and generating the encoded archive file; and prior to applying the RENAME QEDX operator on the encoded version of the second archive file, the file extension of the encoded version of the second archive file defines a map identifying a sequence of processing operations required to enable deconstruction of the QEDX file.

8. The system of claim 7, wherein the storage device storing the indexable and searchable repository is in network communication with the processor using the network interface.

9. The system of claim 7, wherein the storage device storing the indexable and searchable repository is connected using a serial interface to the processor.

10. The system of claim 7, wherein the processor is further configured to:

transmit the DO unique identifier and the initial DO to a first different computation device using a network interface.

11. The system of claim 7, wherein the initial DO is received over a network connection and stored in the local data storage.

12. A method of creating a data file, the method comprising:

receiving, an initial data object (DO), the initial DO comprising a combination of a digital data file and additional data object data, the additional data object data comprising data object rights data defining data rights and/or restrictions associated with the data object;

generating, using a processor, a DO unique identifier based on a cryptographic hash sum of the initial DO, wherein the DO unique identifier is based on a cryptographic hash sum of the combination of the digital data file and the additional data object data;

generating, using the processor, a first archive file comprising the DO unique identifier and the initial DO;

generating, using the processor, an encrypted version of the first archive file;

generating, using the processor, a second archive file comprising the encrypted archive file and decryption information associated with the decryption of the encrypted archive file;

generating, using the processor, an encoded archive file comprising an encoded version of the second archive file;

generating, using the processor, a QEDX file by modifying a file extension of the encoded version of the second archive file;

storing the QEDX file in a non-transitory storage memory by storing, in a storage device in communication with the processor, the QEDX file in an indexable and searchable repository, the indexing configured to make the QEDX file findable in a search of the repository; and removing any intermediate data objects generated during the process of generating the QEDX file;

wherein, generating the first archive file, generating the encrypted version of the first archive file, generating the second archive file, and generating the encoded archive file progressively appends a set of appended file extensions to generate the file extension of the encoded version of the second archive file; and prior to modifying the file extension of the encoded version of the second archive file, the file extension of the encoded version of the second archive file defines a map identifying a sequence of processing operations required to enable deconstruction of the QEDX file.

13. The method of claim 12, wherein the indexable and searchable repository is in network communication with the processor using the network interface.

14. The method of claim 12, wherein the indexable and searchable repository is connected using a serial interface to the processor.

15. The method of claim 12, wherein the method of creating the data file is performed by two or more computing devices, and the method further comprises:

transmitting, using a network interface, the DO unique identifier and the initial DO over a network to a first different computation device; and deleting the DO unique identifier and the initial DO.

16. The method of claim 12, wherein the initial DO is received over a network connection and stored in a local attached memory.

* * * * *